April 20, 1937. H. W. EKHOLM 2,077,551
BRAKE SHOE TIGHTENER
Filed March 16, 1932 4 Sheets-Sheet 2
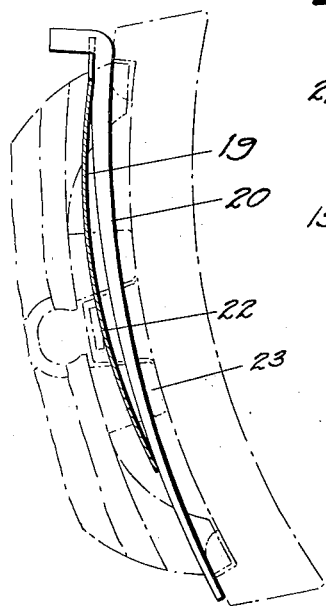
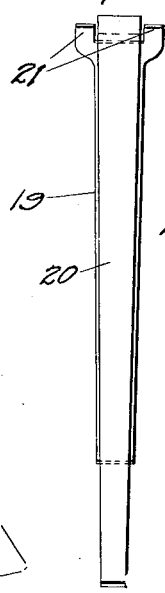
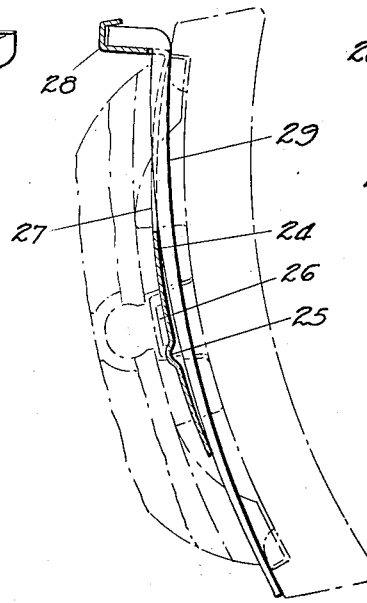
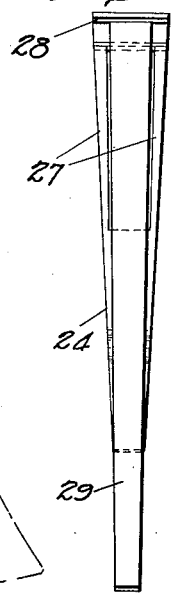
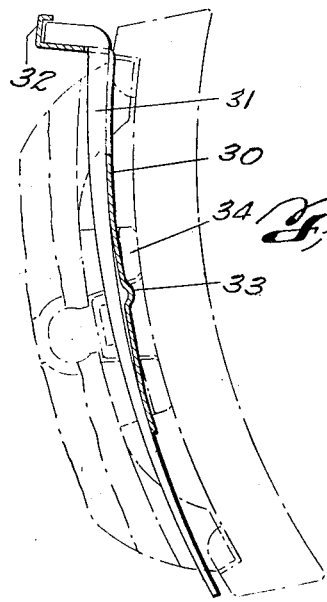
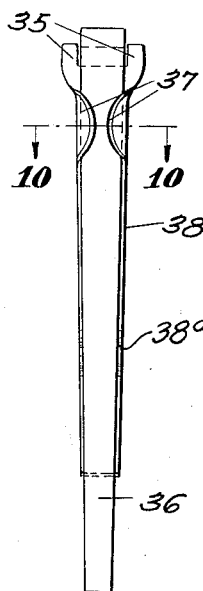
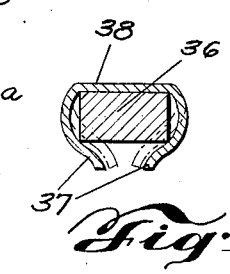
Inventor
Herbert W. Ekholm
By Rodney Badell
Attorney

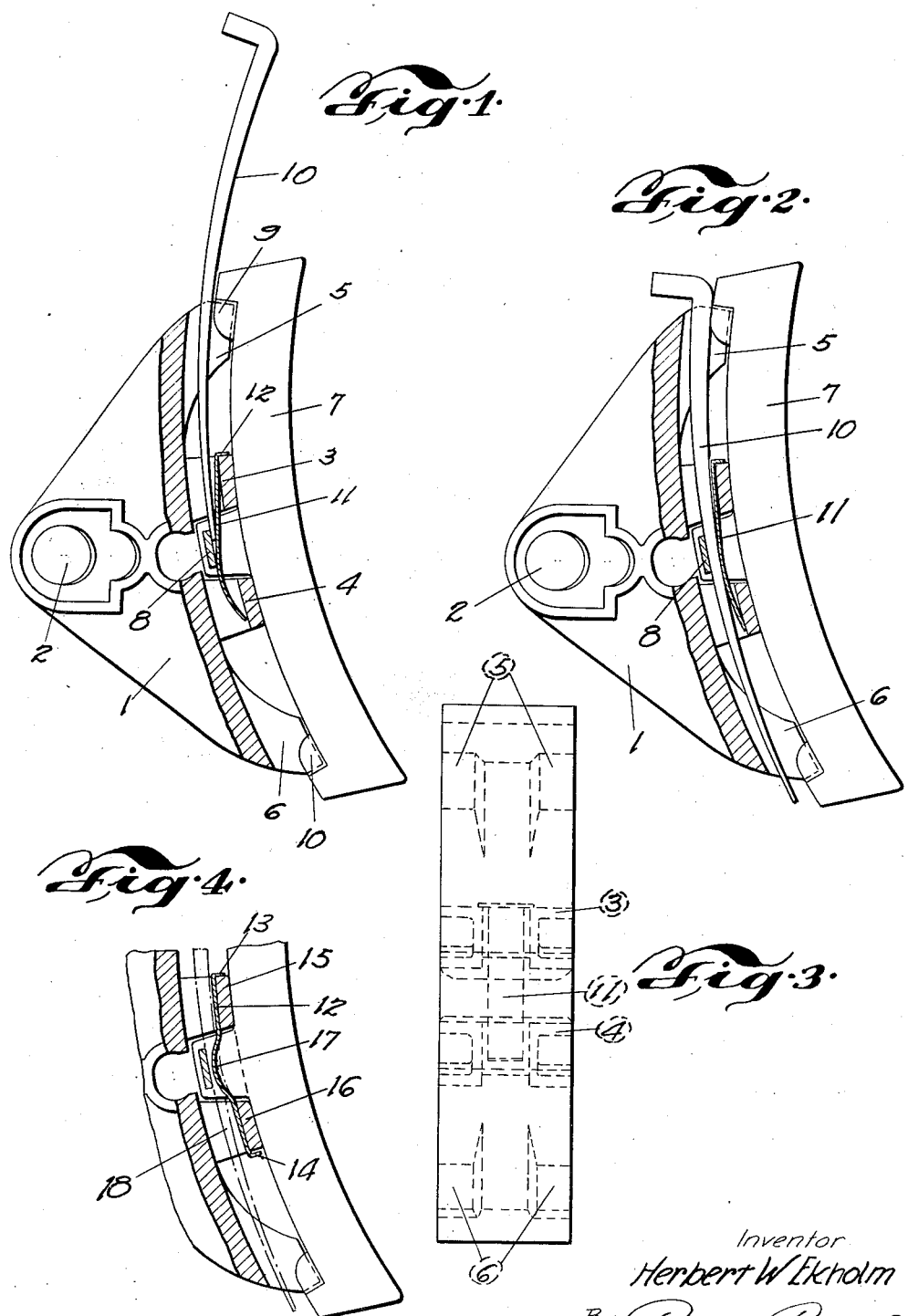

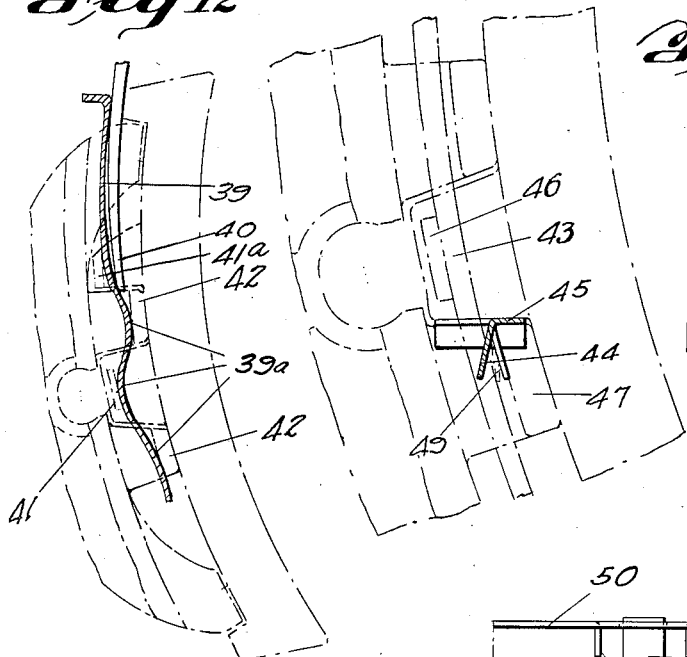
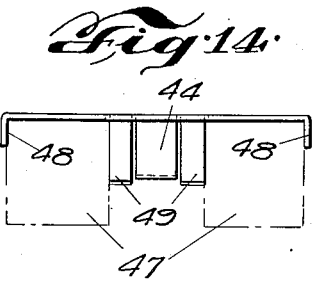
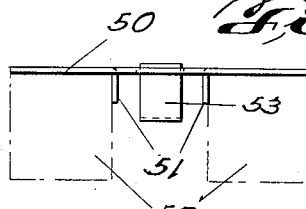
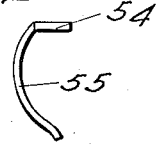
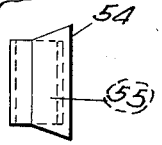
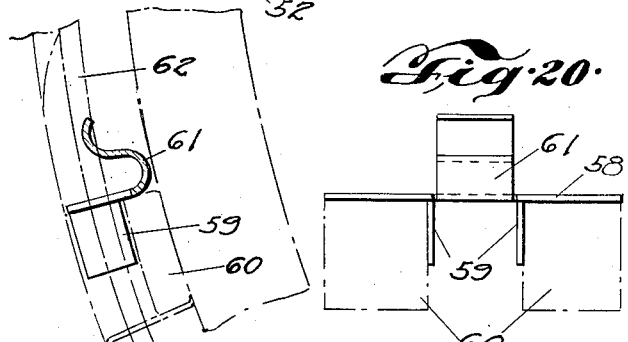
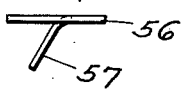
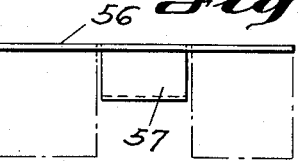

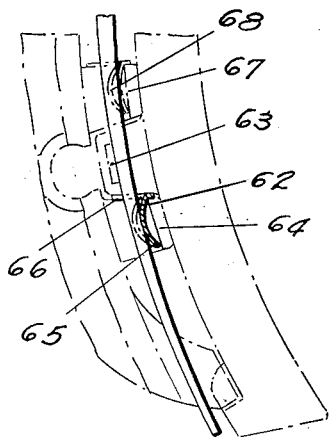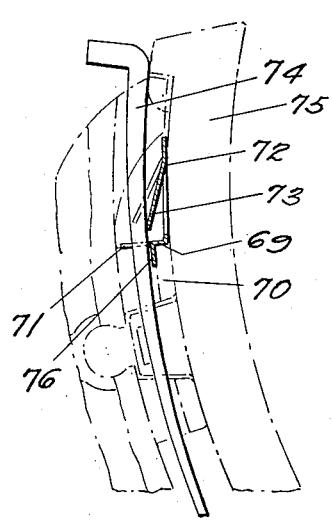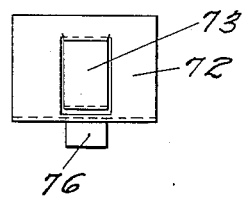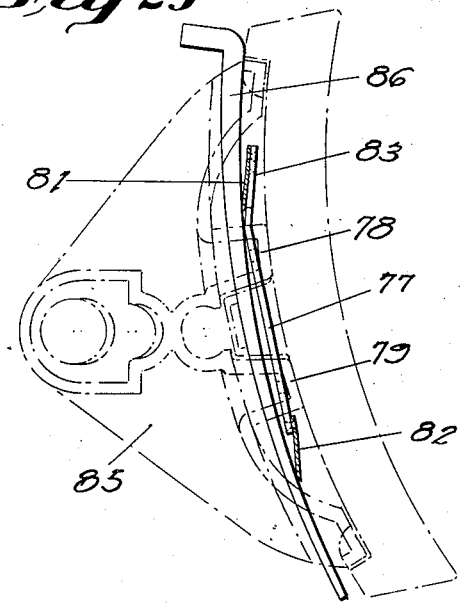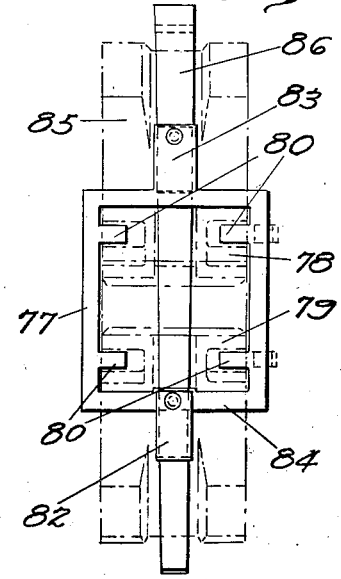

Patented Apr. 20, 1937

2,077,551

UNITED STATES PATENT OFFICE 2,077,551

BRAKE SHOE TIGHTENER

Herbert W. Ekholm, Chicago, Ill., assignor to Chicago Railway Equipment Company, Chicago, Ill., a corporation of Illinois Application March 16, 1932, Serial No. 599,130

22 Claims. (Cl. 188—243)

This invention relates to brakes for railway vehicles and particularly to means for maintaining the brake head and shoe tightly assembled.

Where the brake beam is unsupported, the swinging of the beam on its hangers causes the upper portion of the shoe to tap against the wheel tread which results in relative movement between the shoe and brake head. This relative movement is aggravated where the shoe retaining key is worn and causes wearing away of the comparatively soft head lugs which necessitates periodical replacement of the head.

This relative movement between the head and shoe is reduced to a minimum or avoided where the key fits tightly within the head and shoe lugs. However, due to the wide-spread operation of railway cars on railroads other than that of the owner, a general replacement of worn brake shoe keys is not practical since railroads generally make no provision for compensating a foreign road for such repairs. Consequently, a considerable percentage of the brake equipment at present in use, and especially under freight cars, is in a defective condition and subject to brake failure due to loss of brake shoes.

Various self-tightening keys have been developed for compensating for wearing of the key, and the head and shoe lugs holding the head and shoe tightly together. However, these keys usually embody special shaping or materials which add to the cost of the key or prevent the use of the key with all standard types of heads and shoes.

The main object of the present invention is to provide a separate spring element which may be applied to the assembled head and shoe and which will cooperate with the key to maintain these parts tightly assembled when the key or head lugs are worn, thus preventing relative movement between the head and shoe.

This object and other detail objects pointed out below are attained substantially by the structures illustrated in the accompanying drawings, in which—

Figures 1 and 2 are side views of a brake head and shoe assembly, portions being shown in section, and the key being shown in different positions.

Figure 3 is a front view of the assembly.

Figure 4 is a side view partly in section illustrating a modification.

Figures 5, 7, 11, 12, 13, 21, 22, 23 and 25 are side views, with springs sectioned, of other modifications, the head and shoe being indicated in broken lines.

Figures 6, 8, 14, 20, 24 and 26 are front views of the spring and other elements shown in Figures 5, 7, 13, 21, 23 and 25, respectively.

Figure 9 is a front view of a key assembled with a modified spring element.

Fig. 10 is a section on the line 10—10 of Figure 9.

Figure 15 is a front view of a slightly modified form of spring element.

Figures 16 and 17 are side and top views, respectively, of another form of the spring element.

Figures 18 and 19 are side and top views of another form of spring, the head lugs being indicated in broken lines in Figure 19.

In Figures 1, 2, and 3, a brake head 1 is illustrated having the usual opening 2 for the converging ends of the tension and compression members of a truss-type brake beam (not shown), vertically spaced center lugs 3 and 4, and pairs of top and bottom toes 5 and 6. The brake shoe 7 has a central lug 8 inserted between the head lugs 3 and 4 and has top and bottom projections 9 and 10 inserted between the head toes 5 and 6, respectively. Before the application of the usual key 10 a separate spring element 11 is applied to the assembly, as shown in Figure 1, the element having a top flange 12 resting on the top head lug 3 and having a curved body portion extending through shoe lug 8, the lower end of the element engaging the bottom head lug 4. As the key 10 is driven to the position shown in Figure 2, the front surface thereof bears against the body of the spring 11 and thereafter the key is maintained tightly in engagement with the shoe lug 8 regardless of wear of the key. The spring takes up play between the key, head and shoe and thereby tends to eliminate vibration or pounding between the shoe and head due to tapping of the shoe on the wheel tread.

In Figure 4, the separate spring element 12 has flanges 13 and 14, at the top and bottom which hook over both of the head lugs 15 and 16, and has a central bowed portion 17, located within the shoe lug in the assembled position, which will bear against the forward surface of the driven key 18, shown in broken lines.

In Figures 5 and 6, a longer flat spring element 19 is inserted through the overlapping lugs of the assembled head and shoe and bears against the rear surface of the key 20 instead of the front surface thereof as in the previous forms. The element 19 has spaced ears 21 at the top on each side of the head of the key 20 and a curved body portion which bears against the shoe lug 22. The lower end of the spring element engages the key at a point beneath the lower head lug 23.

In Figures 7 and 8, spring element 24 engages the rear surface of the key, as in Figures 5 and 6, but has a crimp 25 engaging the lower edge of the shoe lug 26 to resist displacement of the spring element. The spring also has bifurcations 27 in the upper part of the body thereof, and at the top has a hook 28 engaging the top of the key to prevent loss of the key 29 if the car is inverted, as in machine dumping, or otherwise. The top portion of the spring element may be sprung to the left (Figure 7) to permit the key to be fully driven.

In Figure 11, spring element 30 inserted in front of key 31, has bifurcations at the top at each side of the key and a hook 32 for preventing inadvertent dislodgment of the key. The spring is provided with a crimp 33 which engages the lower edge of the upper head lug 34.

The separate spring shown in Figures 9 and 10 has spaced fingers 35 at the top on each side of the head of key 36, as in Figures 5 and 6. Immediately below the fingers 35 the spring 38 has a widened portion including ears 37 bent towards each other. The normal position of ears 37 is indicated in broken lines in Figure 10 and the ears are sprung outwardly to the full line position when the key is driven therethrough and grip the key and yieldingly resist its withdrawal. A crimp 38a is provided in the body of the spring corresponding to the bend 33 in Figure 11.

In Figure 12, an elongated flat spring 39 has a plurality of bends 39a which engage the usual lugs 41 and 42 of the assembled shoe and head and an intermediate shoe lug 41a above the top head lug. The key 40 is driven down in back of spring 39 and engages the shoe lugs and alternate bends 39a of the spring.

In Figures 13 and 14, the key 43 is engaged by a spring tongue portion 44 of an element including a flat part 45 inserted between and gripped by the shoe lug 46 and the bottom head lug 47. Part 45 has flanges 48 at the ends engaging the outer side edges of the head lug 47 and has depending fingers 49 extending along the inner surface of the lug 47.

The form shown in Figure 15 is similar to that in Figures 13 and 14 except the end flanges 48 and depending tongue-like portions 49 are eliminated, lateral movement of the insert 50 being prevented by depending portions 51 engaging and gripping the inner side surfaces of the head lug 52. Spring tongue 53 engages the key in the same manner as tongue 44 in Figure 13.

In Figures 16 and 17, the spring element comprises a flat top portion 54 for insertion between abutting head and shoe lugs, and a curved tongue-like portion 55 for engaging the key. The spring element is applied in the same manner as the spring device in Figures 13 and 14, portion 54 and tongue 55 corresponding in disposition and function with part 45 and tongue 44, respectively, of these figures except that the tongue 55 is curved and the key engages the side of the curved tongue instead of the lower edge, as in Figures 13 and 14.

In Figures 18 and 19, the separate spring element comprises a flat body portion 56 arranged to be gripped between the head and shoe lugs, the former being indicated in broken lines in Figure 19, and an inclined tongue 57 for engaging the key, friction between the portion 56 and the abutting lugs serving to maintain the spring element in position.

In Figures 20 and 21, the spring element has a flat body portion 58 resting on the upper head lug 60 and depending flanges 59 gripping the inner side surfaces of the head lug 60 in the manner illustrated in Figure 15, but the spring tongue 61 is curved upwardly and includes a reverse bend which engages the key 62.

In Figure 22, the spring element includes a U-shaped flat portion 66 gripped between the shoe lug 63 and the bottom head lug 64, and the element has a curved spring tongue 65, similar to that shown in Figure 16. A similar spring element may be applied to the upper head lug 67, as shown in broken lines at 68, the arms of portion 66 in this case serving to more stably mount the upper spring element upon the head lug.

In Figures 23 and 24, the separate spring element comprises a horizontal base portion 69 for resting on the upper head lug 70 and including arms 71 extending along the sides of the head lug, a depending tongue 76, and an upright portion 72 resting against the back of the shoe 75 from which projects spring tongue 73 which engages the key 74.

Each of the forms shown in Figures 13 to 24, inclusive, is preferably formed by suitable cutting and bending a flat sheet of spring material. In each of these forms, except those in Figures 20, 21, 23 and 24, the flat upper portion gripped between the adjacent head and shoe lugs also serves as a wear resisting element.

In Figures 25 and 26, a frame 77 inserted over the head lugs 78 and 79 has inward projections 80 which extend into openings provided in the sides of the head lugs and which maintain the frame in position. Springs 81 and 82 are respectively, attached to a tongue 83 projecting from the top of frame 77 and to the lower bar 84 of the frame, the springs being inclined rearwardly from the frame towards the head 85 and engaging the driven key 86.

In each of the modifications, except the last, the novel key tightening device comprises a separate spring-like element formed from a single piece of metal and is readily and effectively applicable to the brake head assembly regardless of the condition of wear of the key or shoe and head lugs. Moreover, the spring element is sufficiently inexpensive to warrant application to old equipment, thus avoiding loose brake shoes without the necessity of supplying new keys.

Obviously, the invention is not limited to the forms shown but may be embodied in other arrangements in which a separate spring element is inserted between the key and either the brake head or shoe. The exclusive use of all such modifications as come within the scope of the appended claims is contemplated.

What is claimed is:

1. In combination, a brake head member, a brake shoe member mounted thereon, a key securing said members together, and a separate spring element inserted between and detachably engaging said key and one of said members and maintaining all of said parts tightly assembled.

2. In combination, a brake head member and a brake shoe member having overlapping lug elements, a key extending through said lugs, and a separately formed and applied spring element engaging said key and at least one of said lug elements and maintaining all of said parts tightly assembled.

3. In combination, brake head and brake shoe members, a key securing said members together, and a separately formed and applied spring element engaging said key and one of said members and maintaining all of said parts tightly assembled, said element including means cooperating with one of said members to resist displacement of said element from its operative position.

4. In combination, brake head and brake shoe members, a key securing said members together, and a separately applied spring element engaging said key and one of said members and maintaining all of said parts tightly assembled, said element including means cooperating with said key to resist displacement of the latter from its normal operative position.

5. In combination, brake head and brake shoe members having overlapping lugs, a key securing said lugs together, and a separate spring element inserted between said key and one of said members and having a portion yieldingly resisting displacement of said key from its assembled position, said portion being movable laterally to permit driving of said key.

6. The combination of parts specified in claim 5 in which said spring element includes a portion disposed to cooperate with one of said members to resist displacement of said element from its normal operative position.

7. In combination, brake head and brake shoe members having overlapping lugs, a key extending through said lugs and securing said members together, and a separate spring element inserted between said head lug and the forward surface of said key and maintaining all of said parts tightly assembled.

8. In combination, a brake head having spaced lugs, a brake shoe having a lug inserted between said head lugs, a key extending through said lugs and securing said head and shoe together, and a spring element hooked over at least one of said head lugs and engaging said key, said element maintaining said head, shoe, and key tightly assembled.

9. In combination, brake head and brake shoe members having overlapping lugs, a key extending through said lugs and securing said members together, and a separately applied element engaging said key and said head lug and having a spring portion engaging said key and urging the same towards said head member for maintaining all of said parts tightly assembled.

10. In combination, brake head and brake shoe members having overlapping lugs, a key extending through said lugs and securing said members together, and a separate tightening element including a portion inserted between adjacent head and shoe lugs and a spring portion engaging said key and maintaining said head, shoe, and key tightly assembled.

11. In combination, a brake head having spaced shoe attaching lugs, a brake shoe having a lug inserted between said head lugs, a key extending through said lugs and securing together said head and said shoe, and a separate tightening element including a portion gripped between adjacent head and shoe lugs and a spring portion engaging said key and maintaining said head, shoe, and key tightly assembled.

12. In combination, brake head and brake shoe members, a key securing said members together, and a separate spring element engaging said key and the back surface of said shoe and maintaining all of said parts tightly assembled.

13. In combination, a break head and a brake shoe having overlapping lug members, a key extending through said members and securing said head and shoe together, and a tightening element maintaining all of said parts tightly assembled and including a portion resting on one of said lugs, and a spring portion engaging said key and the back of said shoe.

14. In combination, a brake head member, a brake shoe member mounted thereon, a key securing said members together, and a separate spring element detachably engaging the back surface of said key and one of said members and maintaining all of said parts tightly assembled.

15. A brake assembly including a head member, a shoe member mounted thereon, a key member securing said members together, and a separate spring element inserted between said key and said shoe lug and maintaining all of said parts tightly assembled, said element being applied to the assembly independently of said members.

16. A brake assembly including a head and a shoe member having overlapping lugs, a key extending through said lugs and securing said members together, and a flat spring element also extending through said lugs and engaging at least one of the same and said key and maintaining all of said parts tightly assembled, said element and said key being independently applied to the assembly.

17. In combination, a brake head and a brake shoe having overlapping lug members, a key extending through said members and securing said head and shoe together, and a flat spring element also extending through said lug members and engaging at least one of the same and said key and maintaining all of said parts tightly assembled, said element having an offset end portion cooperating with one of said members and with said key, respectively, to resist displacement of said element and said key from their normal operative positions.

18. In combination, brake head and brake shoe members having overlapping lugs, a key extending through said lugs and securing said members together, and a spring element maintaining all of said parts tightly assembled and having portions gripping one of said lugs and a portion engaging said key.

19. In combination, a brake head having spaced lugs, a brake shoe having a center lug inserted between said head lugs and an intermediate lug above the same, a key extending through said lugs and securing said head and shoe together, and a separate spring element engaging both of said shoe lugs and the rear surface of said key and maintaining all of said parts tightly assembled.

20. A separately formed key tightener for application to assembled brake head and shoe members and a key and comprising a portion for engaging one of said members and a spring portion for detachably engaging the key.

21. In combination, brake head and shoe members, a key securing said members together, and a separately formed and applied tightening element having portions slidably engaging said key and one of said members and a spring portion maintaining said members and said key tightly assembled.

22. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of a wear plate fitting between opposing faces of the lugs and embodying spring means for engaging frictionally the key and holding the latter against longitudinal displacement.

HERBERT W. EKHOLM.